(12) United States Patent
Nakao

(10) Patent No.: US 7,701,897 B2
(45) Date of Patent: Apr. 20, 2010

(54) MESSAGE DATA PROCESSING METHOD FOR A MOBILE COMMUNICATIONS TERMINAL, MOBILE COMMUNICATIONS TERMINAL, AND MESSAGE DATA PROCESSING PROGRAM FOR A MOBILE COMMUNICATIONS TERMINAL

(75) Inventor: Kenichi Nakao, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1772 days.

(21) Appl. No.: 10/747,089

(22) Filed: Dec. 30, 2003

(65) Prior Publication Data
US 2004/0208141 A1 Oct. 21, 2004

(30) Foreign Application Priority Data
Jan. 20, 2003 (JP) ............................. 2003-010989

(51) Int. Cl.
H04Q 7/00 (2006.01)
H04M 1/66 (2006.01)
H04M 1/00 (2006.01)
H04B 1/06 (2006.01)
H04B 1/38 (2006.01)

(52) U.S. Cl. .................... 370/328; 455/412.1; 455/26.1; 455/565

(58) Field of Classification Search ................. 370/328; 455/412.1, 26.1, 565
See application file for complete search history.

(56) References Cited

U.S. PATENT DOCUMENTS

| | | | | |
|---|---|---|---|---|
| 5,646,604 A | * | 7/1997 | Maruyama et al. | 340/5.22 |
| 5,797,094 A | * | 8/1998 | Houde et al. | 455/412.2 |
| 5,884,185 A | * | 3/1999 | Kim | 455/566 |
| 7,039,443 B2 | * | 5/2006 | Opela et al. | 455/565 |
| 7,099,651 B2 | * | 8/2006 | Takae et al. | 455/406 |
| 7,454,467 B2 | * | 11/2008 | Girouard et al. | 709/206 |
| 2001/0005859 A1 | * | 6/2001 | Okuyama et al. | 709/245 |
| 2003/0051155 A1 | * | 3/2003 | Martin | 713/201 |
| 2003/0101071 A1 | * | 5/2003 | Salonen | 705/1 |

FOREIGN PATENT DOCUMENTS

| | | |
|---|---|---|
| JP | 8-340566 | 12/1996 |
| JP | 2002-373140 | 12/2002 |

* cited by examiner

*Primary Examiner*—Ayaz R Sheikh
*Assistant Examiner*—Blanche Wong
(74) *Attorney, Agent, or Firm*—Oblon, Spivak, McClelland, Maier & Neustadt, L.L.P.

(57) ABSTRACT

When a mobile communications terminal receives message data, operations by a message data processing section that processes message data are prohibited. Operations by the message data processing section may be prohibited simply when message data is received by the mobile communications terminal, or operations by the message data processing section may be prohibited when specific information, such as information including certain characters, time, sender address and the like, included in the message data matches preset information. Thus, there can be provided a message data processing method for a mobile communications terminal in which even if a user is away from the mobile communications terminal, the viewing of the contents of message data by others can be prevented, and in which security functions are enhanced so that others cannot view the contents of message data that is sent to the mobile communications terminal at times not expected by the user.

15 Claims, 5 Drawing Sheets

| | SETTING PARAMETER | FLAG | SETTINGS |
|---|---|---|---|
| (1) | FOLD | 0 | |
| (2) | SLEEP (POWER SAVE) | 1 | |
| (3) | SPECIFIC TIME | 1 | 10:00~15:00 |
| (4) | SUBJECT | 1 | IMPORTANT/CONFIDENTIAL |
| (5) | SPECIFIC CHARACTER WITHIN MAIN TEXT | 1 | IMPORTANT/CONFIDENTIAL |
| (6) | SPECIFIC ADDRESS | 1 | @abc.co.jp |

MESSAGE DATA PROCESSING METHOD FOR A MOBILE COMMUNICATIONS TERMINAL, MOBILE COMMUNICATIONS TERMINAL, AND MESSAGE DATA PROCESSING PROGRAM FOR A MOBILE COMMUNICATIONS TERMINAL

CROSS REFERENCE TO RELATED APPLICATIONS

The present document claims priority to Japanese Priority Document JP 2003-010989, filed in the Japanese Patent Office on Jan. 20, 2003, the entire contents of which are incorporated herein by reference to the extent permitted by law.

BACKGROUND OF THE INVENTION

1. Field of the Invention

The present invention relates to a message data processing method for a mobile communications terminal, to a mobile communications terminal, and a message data processing program for a mobile communications terminal. More specifically, the present invention relates to a technology for enhancing security by preventing others from viewing the contents of message data.

2. Description of Related Art

Mobile telephones can be carried around with ease, and allow not only phone calls, but also the exchange of message data as in e-mail, and hence have become very popular in recent years. However, since they can be carried around and used easily, thereby leading to possibly having information read therefrom by others.

As such, in order to prevent the contents of received message data from being read by others, mobile telephones are equipped with such functions where user operation is rejected and each function is locked and its use prohibited. In the present specification, this will be referred to as dial lock function. The dial lock function is activated when a user operates the mobile telephone in a specific manner, or by repeatedly receiving a call from a designated number.

This dial lock function can only be activated when the user intends for it to be activated. However, since e-mails in mobile telephones are distributed in a push-fashion from a server, information is added to mobile telephones at times unexpected by the user. Therefore, if a mobile telephone is left on a desk without having the dial lock function activated, some other person may read the newly received e-mail. In other words, because e-mails often arrive at unexpected times, it is difficult for the user to activate the dial lock function effectively.

In addition, in Japanese Patent Application Publication 2001-339509 (pages 6 and 7, and FIGS. 1 through 3), there is disclosed a mobile communications terminal apparatus having a key lock function for rejecting key operations. In this mobile communications terminal apparatus, when a text message is received in a state where the key lock function is activated, the key lock function is automatically deactivated, and then, if no key operations are subsequently performed, or if the apparatus is left in standby mode for a predetermined period of time, the lock is reactivated.

However, in this mobile communications terminal apparatus disclosed in Japanese Patent Application Publication 2001-339509, because the key lock is deactivated when a text message is received, it is possible for other people to read the contents of the message. In addition, although this mobile communications terminal apparatus is designed so that the lock is reactivated if no key operations are performed, or if the apparatus is left in standby mode for a predetermined period of time, other people may still be able to read the contents of the message before the lock is reactivated. Thus, mobile telephones in the past have not necessarily been able to ensure adequate security.

SUMMARY OF THE INVENTION

As such, the present invention is proposed in view of such issues, and provides a message data processing method for a mobile communications terminal, a mobile communications terminal, a message data processing program for a mobile communications terminal with a security function that is enhanced so that the contents of message data that may be received by the mobile communications terminal at unexpected times are prevented from being read by others.

A message data processing method for a mobile communications terminal and which is related to the present invention prohibits operations that are driven by message data processing means for processing message data when message data is received by the mobile communications apparatus.

According to the method above, since operations by the message data processing means for processing message data are prohibited when the mobile communications terminal receives message data, even if the mobile communications terminal is left unattended on a desk, the contents of the message data received by the mobile communications terminal cannot be read by others.

A mobile communications terminal related to the present invention may be comprised of message data processing means for processing message data, reception means for receiving this message data, and operation prohibition means for prohibiting operations that are driven by the message data processing means mentioned above when message data is received.

According to the mobile communications terminal above, since operations by the message data processing means are prohibited by the operation prohibition means when the reception means receives message data, even if the mobile communications terminal is left on a desk, the contents of the message data received by the mobile communications terminal cannot be read by others.

In addition, a mobile communications terminal related to the present invention may be comprised of an antenna and a communications control circuit section for receiving message data, a message data processing section for processing message data, and an operation prohibition setting section for prohibiting operations that are driven by the message data processing section above when message data is received.

A message data processing program for a mobile communications terminal and which is related to the present invention is comprised of a step of receiving message data, and an operation prohibition step of prohibiting operations that are driven by message data processing means for processing message data when message data is received.

According to the message data processing program above, when message data is received, operations by the message data processing means for processing the message data are prohibited.

DESCRIPTION OF THE PREFERRED EMBODIMENTS

Embodiments of the present invention will now be described with reference to the drawings. The embodiment below is one in which the present invention is applied to a mobile telephone, where when the mobile telephone receives message data, operations by message data processing means for processing message data are prohibited.

[Configuration of Mobile Communications Terminal]

Figure 1:
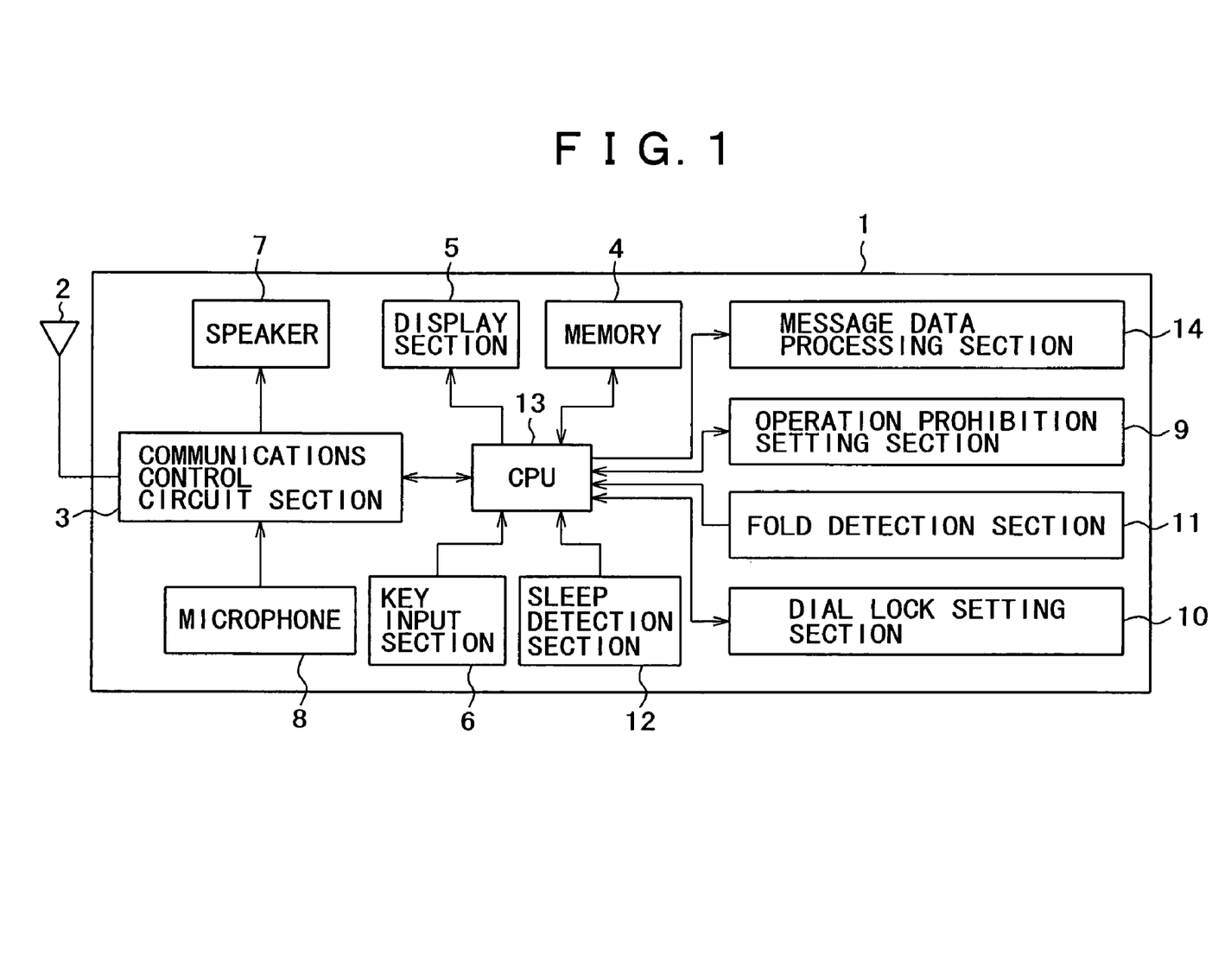
FIG. 1 is a block diagram showing an embodiment of a mobile communications terminal related to the present invention.

A mobile communications terminal 1 includes a first housing and a second housing, and is a flip phone in which these two housings are made freely foldable through a hinge section. As shown in FIG. 1, the mobile communications terminal 1 includes an antenna 2 and a communications control circuit section 3, the two of which form reception means, a memory 4, a display section 5, a key input section 6, a speaker 7, a microphone 8, a message data processing section 14 as message data processing means for processing message data, an operation prohibition setting section 9 as operation prohibition means for prohibiting operations that are driven by the message data processing section 14, a dial lock setting section 10, a fold detection section 11, a sleep detection section 12 and a CPU 13.

The communications control circuit section 3 mainly includes a CODEC, a baseband signal circuit and an RF circuit (radio frequency circuit). The CODEC encodes audio signals inputted from the microphone 8 and sends them to the baseband signal circuit. The CODEC also supplies to the speaker 7 audio signals that are obtained by decoding signals received from the baseband signal circuit.

The baseband signal circuit adjusts signals received from the CODEC to baseband signals for transmission. The baseband signal circuit also extracts, from baseband signals demodulated by the RF circuit, signals that are processable by the CODEC. The RF circuit supplies to the antenna 2 RF signals on which modulation suiting the baseband signals sent from the baseband signal circuit has been performed. The RF signal circuit also demodulates baseband signals from RF signals received via the antenna 2 and sends them to the baseband signal circuit.

The memory 4 may include, for example, ROM, and stores programs executed by the CPU 13 and various setting data. Particularly, in the present embodiment, there is stored in the memory 4 a message processing program for prohibiting operations that are driven by the message data processing section 14 of the mobile communications terminal 1 when the mobile communications terminal 1 receives message data. In addition, the memory 4 also stores setting condition data for prohibiting operations that are driven by the message data processing section 14. The message data processing program and setting condition data mentioned above will be described later.

The display section 5 may include, for example, a liquid crystal display apparatus, and displays images and the contents of the received message data based on the control by the CPU 13. The key input section 6 may include key buttons, and is used to input setting conditions for prohibiting operations that are driven by the message data processing section 14 and to input instruction information for instructing operations to be performed by the CPU 13.

The speaker 7 outputs audio corresponding to audio signals sent from the CODEC. On the other hand, the microphone 8 imports external audio and converts that audio into audio signals and then sends them to the CODEC.

The message data processing section 14 performs processing related to message data. For example, the message data processing section 14 performs various processing related to message data (e.g. e-mail) such as viewing received message data, creating new message data, creating replies to message data, editing message data, creating forwarded mails, and setting up mail communications. Message data include textual information such as e-mails, which are exchanged between a mail server and the mobile communications terminal 1 via the Internet, and simple messages (short messages) that are exchanged directly between a specific mail server and the mobile communications terminal 1 and not by way of the Internet.

The operation prohibition setting section 9 prohibits operations that are driven by the message data processing section 14 of the mobile communications terminal 1 when the mobile communications terminal 1 receives message data, and instructs the dial lock setting section 10 to activate a dial lock. The operation prohibition setting section 9 may include condition setting means for deciding setting conditions for prohibiting operations that are driven by the message data processing section 14, detection means for detecting specific information included in the received message data, and determination means for determining whether or not the specific information that is detected and information that has been preset match.

Further, when message data is received in a state where the mobile communications terminal 1 is folded, as indicated by a detection signal from the fold detection section 11, the operation prohibition setting section 9 prohibits operations that are driven by the message data processing section 14, and instructs the dial lock setting section 10 to activate a dial lock. In addition, when message data is received in a state where the mobile communications terminal 1 is in sleep mode (power save mode), as indicated by a detection signal from the sleep detection section 12, the operation prohibition setting section 9 prohibits operations that are driven by the message data processing section 14, and instructs the dial lock setting section 10 to activate a dial lock.

In response to the instruction from the operation prohibition setting section 9, the dial lock setting section 10 performs a dial lock process for rejecting key operations by a user. When a dial lock is activated, processing related to message data, such as displaying the contents of received message data or creating a message, is prohibited.

The fold detection signal 11 includes a detection mechanism for detecting whether or not the first housing and the second housing are in a folded state. A detection signal generated by the fold detection section 11 is sent to the operation prohibition section 9. The CPU 13 executes the message data processing program and other various programs stored in the memory 4 to control the operation of the mobile communications terminal 1.

<Settings for Prohibiting Operation of Message Data Processing>

Figure 2:
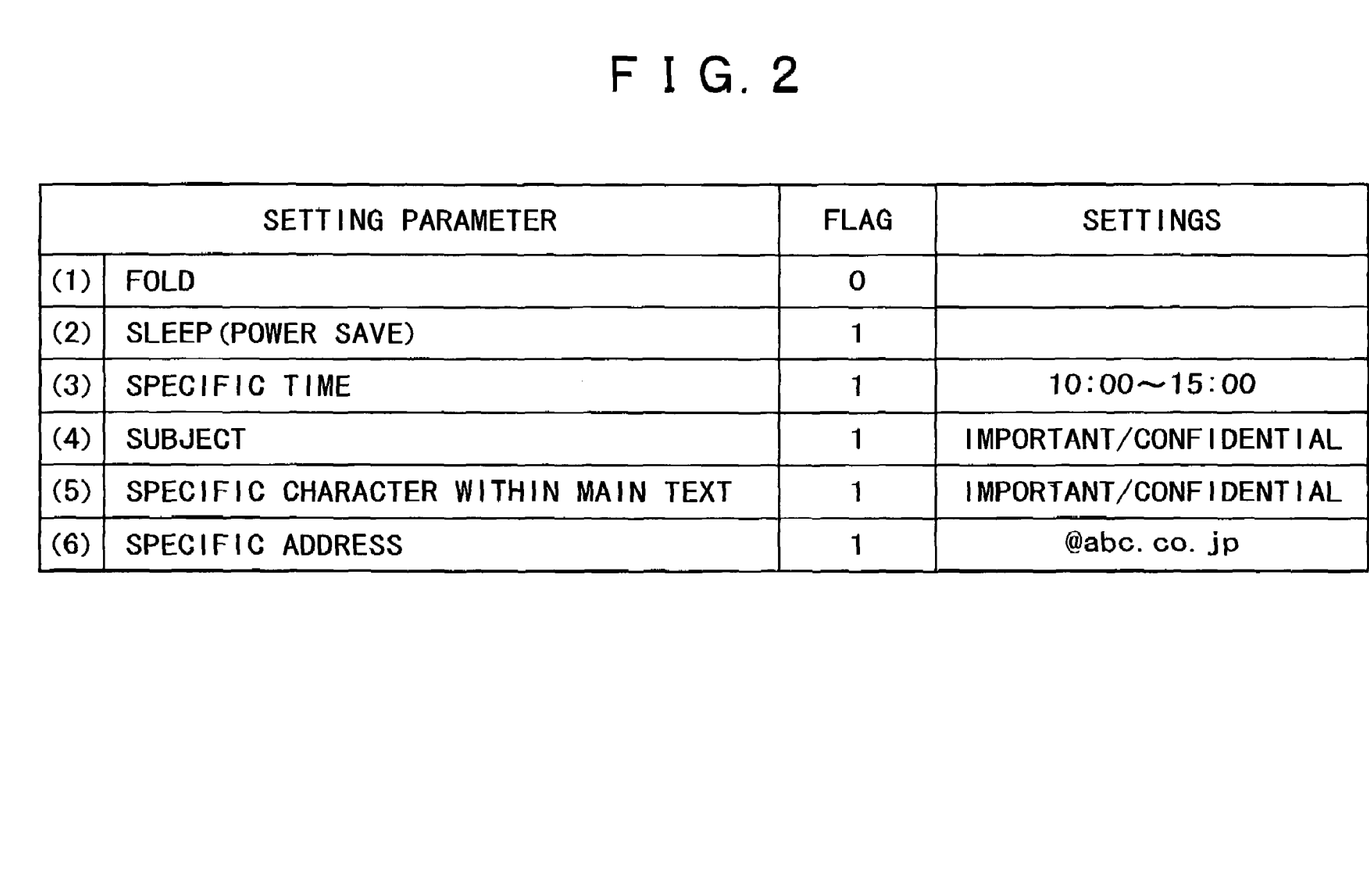
FIG. 2 shows a parameter table of dial lock settings in a mobile communications terminal related to the present invention.

Next, settings for prohibiting operations that are driven by the message data processing section 14 when the mobile communications terminal 1 receives message data will be described. First, a process for registering in the mobile communications terminal 1 conditions for prohibiting the processing of message data will be described. FIG. 2 shows a table in which setting parameters, flags and settings for prohibiting message data processing when message data is received are written.

Setting parameters may include, for example, "fold" which indicates whether or not to prohibit message data processing if the mobile communications terminal 1 is folded, "sleep (power save)" which indicates whether or not to prohibit message data processing if the mobile communications terminal 1 is in sleep mode, "specific time" which indicates a time period during which operations by the message data processing section 14 are stopped, "subject" which is the subject included in message data, "specific character within main text" included in message data, "specific address" of the sender in the message data, and the like.

Figure 3:
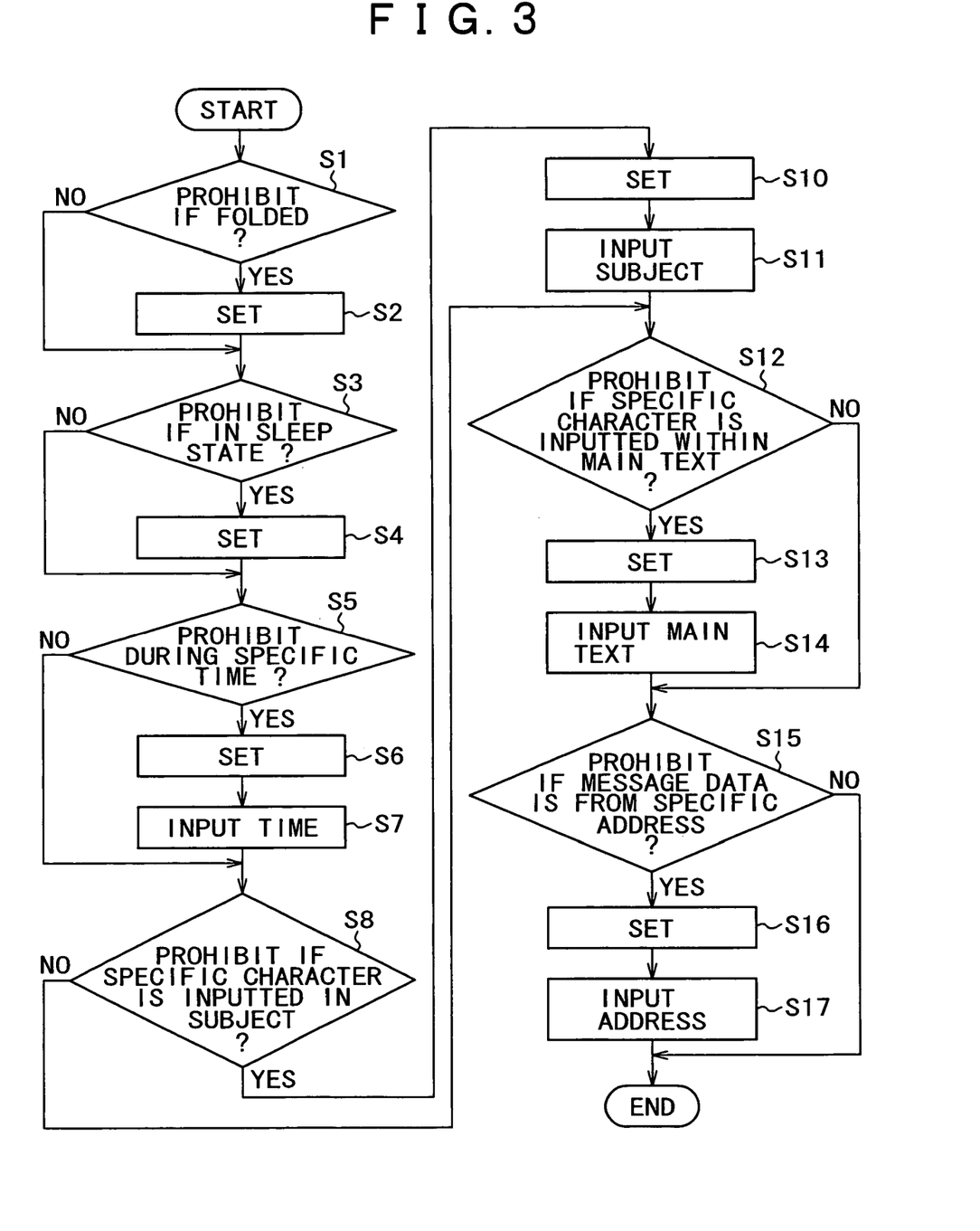
FIG. 3 is a flowchart illustrating the flow for selecting setting conditions for setting specific information for prohibiting operations that are driven by a message data processing section when a mobile communications terminal receives message data.

A user first sets each of the setting parameters mentioned above. The process of setting the setting parameters is shown in the flowchart of FIG. 3. The process shown in FIG. 3 is carried out by the operation prohibition setting section 9, and starts by selecting a mail dial lock setting mode (a mode for prohibiting operations that are driven by the message data processing section 14 when message data is received) for the mobile communications apparatus 1.

In step S1, it is determined whether or not operations by the message data processing section 14 are to be prohibited if message data is received when the mobile communications terminal 1 is folded. If a decision is made to prohibit operations that are driven by the message data processing section 14 (YES), the operation prohibition setting section 9 advances the process to step S2. In step S2, the operation prohibition setting section 9 sets a flag. If in step S1, such a decision is not made (NO), the operation prohibition setting section 9 advances the process to step S3 without setting a flag. In the table shown in FIG. 2, the setting for this parameter is such that operations by the message data processing section 14 are not to be prohibited even if the mobile communications terminal 1 is folded. In the table shown in FIG. 2, a case where a flag has been set is indicated with a "1," and a case where a flag has not been set is indicated with a "0."

In step S3, it is determined whether or not operations by the message data processing section 14 are to be prohibited if message data is received when the mobile communications terminal 1 is in sleep mode. If a decision is made to prohibit operations that are driven by the message data processing section 14 (YES), the operation prohibition setting section 9 advances the process to step S4. In step S4, the operation prohibition setting section 9 sets a flag. If in step S1, such a decision is not made (NO), the operation prohibition setting section 9 advances the process to step S5 without setting a flag. In the table shown in FIG. 2, the setting for this parameter is such that operations by the message data processing section 14 are to be prohibited if the mobile communications apparatus 1 is in sleep mode.

In step S5, it is determined whether or not operations by the message data processing section 14 are to be prohibited if message data is received within a specific time period. If a decision is made to prohibit operations that are driven by the message data processing section 14 (YES), the operation prohibition setting section 9 advances the process to step S6. In step S6, the operation prohibition setting section 9 sets a flag. Then, in step S7, the user inputs a specific time period. If in step S5, such a decision is not made (NO), the operation prohibition setting section 9 advances the process to step S8 without setting a flag. In the table shown in FIG. 2, the setting for this parameter is such that operations by the message data processing section 14 are to be prohibited during a specific time period, and that time period is set to 10:00 to 15:00. In other words, if the mobile communications terminal 1 receives message data between 10:00 to 15:00, operations that are driven by the message data processing section 14 are prohibited.

In step S8, it is determined whether or not operations by the message data processing section 14 are to be prohibited if there is/are a specific character(s) in the subject contained in the received message data. If a decision is made to prohibit operations that are driven by the message data processing section 14 (YES), the operation prohibition setting section 9 advances the process to step S10. In step S10, the operation prohibition setting section 9 sets a flag. Then, in step S11, the user inputs the specific character(s). If in step S8, such a decision is not made (NO), the operation prohibition setting section 9 advances the process to step S12 without setting a flag. In the table shown in FIG. 2, the setting for this parameter is such that specific character(s) in the subject will be checked for, and the specific character(s) (words) are "important" or "confidential." For example, if the word "important" was included in the subject, the operation prohibition setting section 9 would prohibit operations that are driven by the message data processing section 14.

In step S12, it is determined whether or not operations by the message data processing section 14 are to be prohibited if there is/are (a) specific character(s) in the main text contained in the received message data. If a decision is made to prohibit operations that are driven by the message data processing section 14 (YES), the operation prohibition setting section 9 advances the process to step S13. In step S13, the operation prohibition setting section 9 sets a flag. Then, in step S14, the user inputs the specific character(s).

If in step S12, such a decision is not made (NO), the operation prohibition setting section 9 advances the process to step S15 without setting a flag. In the table shown in FIG. 2, the setting for this parameter is such that specific character(s) in the main text will be checked for, and the specific character(s) (words) is/are "important" or "confidential." For example, if the word "important" was included in the main text, the operation prohibition setting section 9 would prohibit operations that are driven by the message data processing section 14.

In step S15, it is determined whether or not operations by the message data processing section 14 are to be prohibited if the sender information included in the received message data is of a specific address. If a decision is made to prohibit operations that are driven by the message data processing section 14 (YES), the operation prohibition setting section 9 advances the process to step S16. In step S16, the operation prohibition setting section 9 sets a flag. Then, in step S17, the user inputs the specific address. If in step S15, such a decision is not made (NO), the operation prohibition setting section 9 terminates the flow without setting a flag. In the table shown in FIG. 2, the setting for this parameter is such that a specific address will be checked for, and the specific address is "@abc.co.jp". For example, if some address contained the characters "@abc.co.jp", the operation prohibition setting section 9 would prohibit operations that are driven by the message data processing section 14.

<Operation for Prohibiting Message Data Processing>

Figure 4:
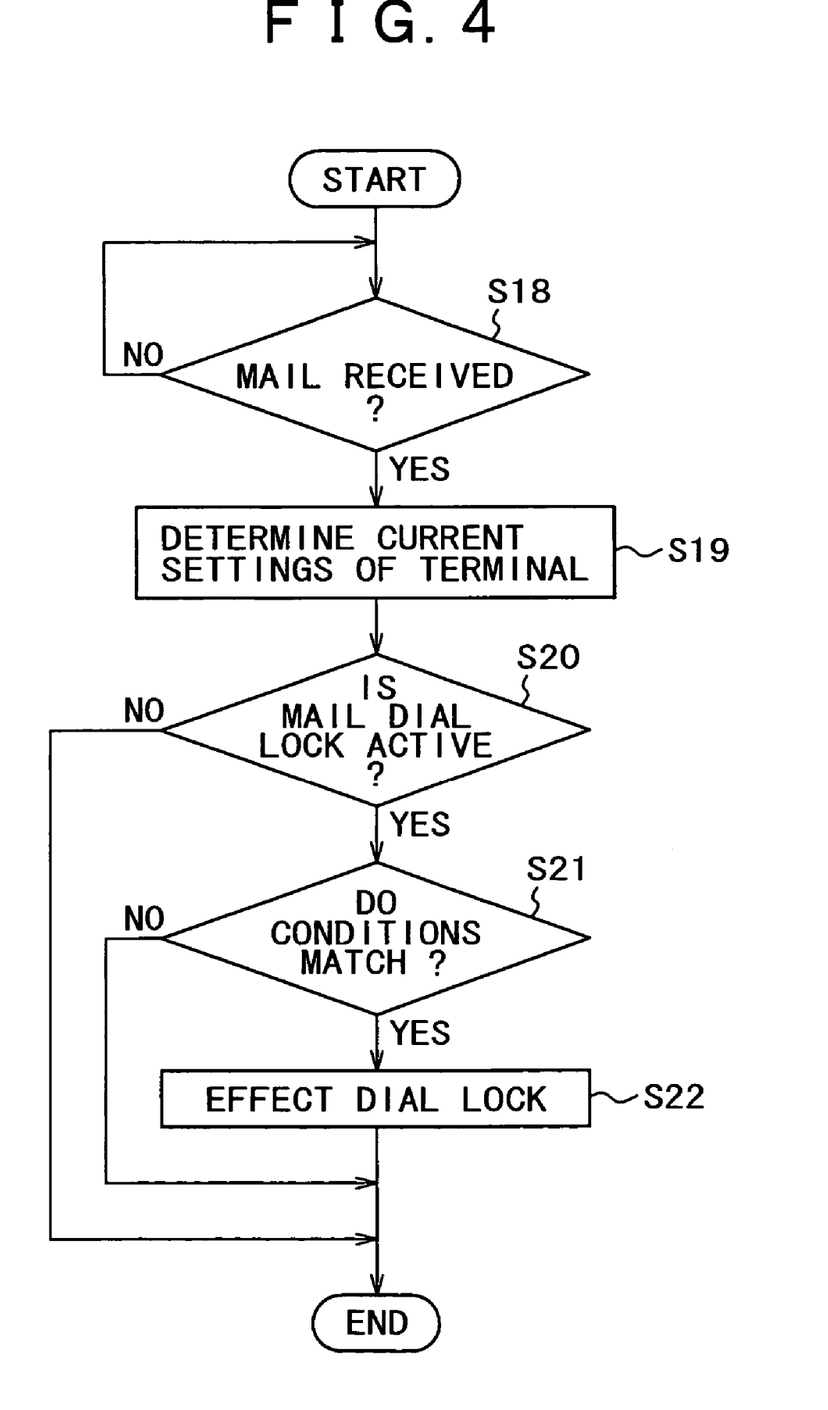
FIG. 4 is a flowchart illustrating the flow for prohibiting operations that are driven by a message data processing section when message data is received by a mobile communications terminal.

A process for prohibiting operations that are driven by the message data processing section 14 when the mobile communications terminal 1 receives message data will be described below. FIG. 4 shows a flowchart of a prohibition process for prohibiting operations that are driven by the message data processing section 14. This prohibition process is started by turning the mobile communications terminal 1 on. In step S18, if the mobile communications terminal 1 receives message data (for example, an e-mail), the operation prohibition setting section 9 advances this prohibition process to step S19. Step S18 is repeated until the mobile communications terminal 1 receives message data.

In step S19, the operation prohibition setting section 9 confirms the current settings of the mobile communications terminal 1. Then in step S20, the operation prohibition setting section 9 determines whether or not the settings confirmed in step S19 are mail dial lock settings for prohibiting operations that are driven by the message data processing section 14 when message data is received. In step S20, if the mobile communications terminal 1 has the mail dial lock settings active, the operation prohibition setting section 9 advances this prohibition process to step S21, where as if the mobile communications terminal 1 does not have the mail dial lock settings active, this prohibition process is terminated.

In step S21, the operation prohibition setting section 9 determines whether or not specific information included in the received message data and the setting parameters that are preset in the mobile communications terminal 1 match. If specific information included in the received message data and the setting parameters that are preset in the mobile communications terminal 1 match, the operation prohibition setting section 9 advances this prohibition process to step S22, prohibits operations that are driven by the message data processing section 14, and effects a dial lock for rejecting key operations by the user.

A dial lock is effected by the dial lock setting section 10, and prohibits operations that are driven by the message data processing section 14 until the user performs a specific operation (for example, the extended pressing of a specific key button) or inputs a password. In addition, in step S22, if the information does not match, the operation prohibition setting section 9 terminates this prohibition process.

Thus, even if the mobile communications terminal 1 receives message data (e.g. an e-mail) while left unattended on a desk, because operations by the message data processing section 14 are prohibited, the user would not have the contents of the message data viewed by an unauthorized third person. Therefore, with such a mobile communications terminal 1, it is possible to enhance the security of the mobile communications terminal 1.

Figure 5:
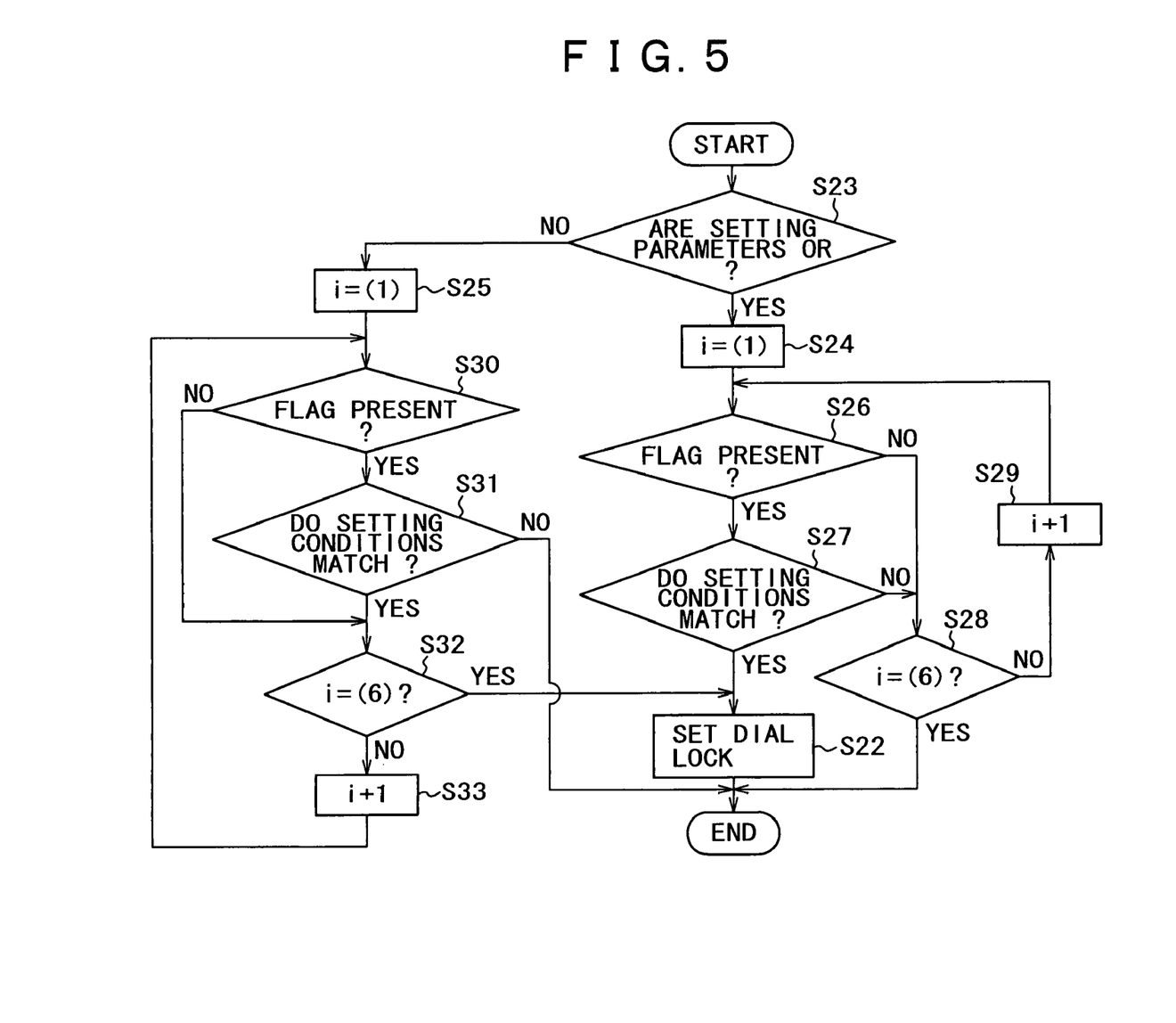
FIG. 5 is a flowchart illustrating the flow for determining setting conditions.

The determination process for setting conditions in step S21 is illustrated in further detail in the flowchart shown in FIG. 5. As shown therein, in step S23, the operation prohibition setting section 9 determines whether or not the relationship between the setting parameters preset in the mobile communications terminal 1 is a logical OR. If the relationship is a logical OR (that is, YES), the operation prohibition setting section 9 advances this determination process to step S24, and if the relationship is not a logical OR (that is, NO), it advances this determination process to step S25 taking the relationship to be a logical AND.

In step S24, the symbol i (numbers 1 through 6 in parentheses assigned to the setting parameters) is initialized. In step S26, the operation prohibition setting section 9 determines whether or not a flag is set in the $i^{th}$ parameter of the setting parameter table of dial lock settings stored in the memory 4. If a flag is set in the $i^{th}$ parameter of the setting parameter table, the operation prohibition setting section 9 advances the determination process to step S27, whereas if a flag is not set, it advances the determination process to step S28.

In step S27, the operation prohibition setting section 9 determines whether or not specific information included in the received message data and the setting information that is set in advance match. If they do match, the operation prohibition setting section 9 advances the determination process to step S22, and activates the dial lock settings. If the specific information included in the received message data and the setting information do not match, the operation prohibition setting section 9 advances this determination process to step S28.

In step S28, the operation prohibition setting section 9 determines whether or not the setting information being checked is the last parameter. In the present example, the symbol i represents setting parameters, and as shown in the setting parameter table in FIG. 2, the parameter identified with a 6 in parentheses is shown as the last setting parameter. In step S27, if the setting parameter being checked is the last parameter (YES), the operation prohibition setting section 9 terminates this determination process, whereas if it is not (NOT), the operation prohibition setting section 9 advances this determination process to step S29.

In step S29, the operation prohibition setting section 9 adds one to the number of the setting parameter. For example, if the setting parameter being checked is number one, one is added to this number, and it is then checked whether or not a flag is set in the second setting parameter. The operation prohibition setting section 9 repeats this process until the number of the setting parameter reaches the last number.

On the other hand, when a determination is to be made based on a logical AND relationship, symbol i is initialized in step S25. In step S30, the operation prohibition setting section 9 determines whether or not a flag is set in the $i^{th}$ parameter of the setting parameter table of dial lock settings stored in the memory 4. If a flag is set in the $i^{th}$ parameter of the setting parameter table, the operation prohibition setting section 9 advances the determination process to step S31, whereas if a flag is not set, it advances the determination process to step S32.

In step S31, the operation prohibition setting section 9 determines whether or not specific information included in the received message data and the setting information that is set in advance match. If they do match, the operation prohibition setting section 9 advances the determination process to step S32, whereas if the specific information included in the received message data and the setting information do not match, the operation prohibition setting section 9 terminates this determination process.

In step S32, the operation prohibition setting section 9 determines whether or not the setting information being checked is the last parameter. In step S32, if the setting parameter being checked is the last parameter (YES), the operation prohibition setting section 9 advances this determination process to step S22, whereas if it is not (NOT), the operation prohibition setting section 9 advances this determination process to step S33. In step S33, the operation prohibition setting section 9 adds one to the number of the setting parameter. For example, if the setting parameter being checked is number one, one is added to this number, and it is then checked whether or not a flag is set in the second setting parameter.

The operation prohibition setting section 9 repeats this process until the number of the setting parameter reaches the last number.

Thus, according to the present embodiment, specific information included in message data is detected, and operations by the message data processing section 14 are prohibited when the detected information matches the conditions that are set in advance. Therefore, even if message data is received in a normal state where no dial lock is set, the message data can be prevented from being viewed by others.

Particularly, in cases where a user is to leave his/her desk for a meeting, by setting, in advance, a time period during which operations by the message data processing section 14 are prohibited, the risk of having a third person view message data can be circumvented even if new message data is received by the mobile communications terminal 1 during that meeting. In other words, even if the user is at a location away from the mobile communications terminal 1, the viewing of message data by others can be prevented, and security is thus enhanced by making it impossible for others to view the contents of message data that is sent to the mobile communications terminal 1 at times not expected by the user. The process carried but in such a case is such that if the time at which message data is received by the mobile communications terminal 1 matches the preset time information, operations by the message data processing section 14 are prohibited.

Similarly, if it is desired that message data from a specific person not be viewed by a third person, by registering, in advance, the mail address of that person in the mobile communications terminal 1, contents of the message data from that person will never be viewed by others. The process carried out in such a case is such that if the sender address information in the message data received by the mobile communications terminal 1 matches the preset address information, operations by the message data processing section 14 are prohibited.

Alternate Embodiments

Although specific embodiments to which the present invention is applied have been described above, the present invention is by no means limited to the embodiments above, and various modifications may be made.

For example, in the embodiment above, when message data is received, specific information included in the message data is detected, and if the detected information matches the preset information, operations by the message data processing section 14 are prohibited. However, operations by the message data processing section 14 may also be prohibited simply when message data is received. In this case, regardless of the contents of the message data, operations by the message data processing section 14 are prohibited when the mobile communications terminal 1 receives message data.

In addition, in the embodiment above, dial lock was effected for the processing of all message data, but in the present invention, dial lock may also be implemented only for newly received message data or unread message data so as to make only newly received message data and unread message data unreadable by a third person.

In addition, in the present invention, it is also possible to categorize dial lock functions for prohibiting operations related to message data processing, and have the user set various security levels. Categories of dial lock functions may include, for example, not being able to view newly received messages, not being able to view the record of incoming messages, not being able to select ring tones for when a message is received, not being able to process any message data, and the like. The user may choose from these lock conditions with respect to the processing of message data.

In addition, in the embodiment above, even if the user accidentally loses the mobile communications terminal 1, by sending message data to the mobile communications terminal 1, operations related to the processing of message data can be prohibited, and the viewing of the contents of message data by a third person can be prevented.

In addition, the present invention may be applied as security means for allowing only the intended recipient to view the contents of message data by sharing specific information for implementing dial lock with the person with whom message data is to be exchanged.

In addition, in the embodiment above, the present invention is applied to a mobile telephone, but the present invention is also applicable to mobile communications terminals such as PDAs (Personal Digital Assistants) having communication functions.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A message data processing method for a mobile communications terminal including a message data processing section configured to process message data, an operation prohibition setting section, and a dial lock setting section, the message data processing method comprising:

receiving the message data in the mobile communications terminal;

in response to receiving the message data, determining, by the operation prohibition setting section of the mobile communications terminal, whether at least one preset condition stored in a memory of the mobile communications terminal is satisfied, the at least one preset condition being customizable by a user of the mobile communications terminal;

prohibiting, by the operation prohibition setting section, processing of the message data by the message data processing section for display, based on a determination that the at least one preset condition is satisfied; and performing, by the dial lock setting section, a dial lock process for rejecting key operations by the user when the processing of the message data is prohibited by the operation prohibition setting section.

2. The message data processing method according to claim 1, wherein the determining comprises determining whether specific information included in the received message data matches the at least one preset condition, and the prohibiting comprises prohibiting processing of the message data by the message data processing section for display, based on a determination that the specific information matches the at least one preset condition.

3. The message data processing method according to claim 2, wherein the determining comprises determining whether reception time information of the received message data matches the at least one preset condition including preset time information, and the prohibiting comprises prohibiting processing of the message data by the message data processing section for display, based on a determination that the reception time information matches the at least one preset condition.

4. The message data processing method according to claim 2, wherein
the determining comprises determining whether sender address information of the message data matches the at least one preset condition including preset address information, and
the prohibiting comprises prohibiting processing of the message data by the message data processing section for display, based on a determination that the sender address information matches the at least one preset condition.

5. The message data processing method according to claim 1, further comprising:
detecting whether the mobile communications terminal is in a folded state, wherein
the prohibiting comprises prohibiting processing of the message data by the message data processing section for display, based on a determination that the mobile communications terminal is detected to be in the folded state.

6. The message data processing method according to claim 1, further comprising:
detecting whether the mobile communications terminal is in a sleep state, wherein
the prohibiting comprises prohibiting processing of the message data by the message data processing section for display, based on a determination that the mobile communications terminal is detected to be in the sleep state.

7. A mobile communications terminal, comprising:
a message data processing unit configured to process message data;
a reception unit configured to receive the message data;
a memory configured to store at least one preset condition, the at least one preset condition being customizable by a user of the mobile communications terminal;
a determining unit configured to, in response to receiving the message data, determine whether the at least one preset condition is satisfied;
an operation prohibition unit configured to prohibit processing of the message data by the message data processing unit for display, based on a determination by the determining unit that the at least one preset condition is satisfied; and
a dial lock setting unit configured to perform a dial lock process for rejecting key operations by the user when the processing of the message data is prohibited by the operation prohibition setting unit.

8. The mobile communications terminal according to claim 7, wherein
the determining unit is configured to determine whether specific information included in the received message data matches the at least one preset condition, and
the operation prohibition unit is configured to prohibit processing of the message data by the message data processing unit for display, based on a determination by the determining unit that the specific information matches the at least one preset condition.

9. The mobile communications terminal according to claim 8, wherein
the determining unit is configured to determine whether reception time information included in the received message data matches the at least one preset condition including preset time information, and
the operation prohibition unit is configured to prohibit processing of the message data by the message data processing unit for display, based on a determination by the determining unit that the reception time information matches the at least one preset condition.

10. The mobile communications terminal according to claim 8, wherein
the determining unit is configured to determine whether sender address information included in the received message data matches the at least one preset condition including preset address information, and
the operation prohibition unit is configured to prohibit processing of the message data by the message data processing unit for display, based on a determination by the determining unit that the sender address information matches the at least one preset condition.

11. The mobile communications terminal according to claim 7, further comprising:
a fold detection unit configured to detect whether the mobile communications terminal is in a folded state, wherein
the operation prohibition unit is configured to prohibit processing of the message data by the message data processing unit for display, based on a determination that the fold detection unit detects that the mobile communications terminal is in the folded state.

12. The mobile communications terminal according to claim 7, further comprising:
a sleep detection unit configured to detect whether the mobile communications terminal is in a sleep state, wherein
the operation prohibition unit is configured to prohibit processing of the message data by the message data processing unit for display, based on a determination that the sleep detection unit detects that the mobile communications terminal is in the sleep state.

13. A mobile communications terminal, comprising:
an antenna and communications control circuit section configured to receive message data;
a message data processing section configured to process the message data;
a memory configured to store at least one preset condition, the at least one preset condition being customizable by a user of the mobile communications terminal;
an operation prohibition setting section configured to, in response to receiving the message data, determine whether the at least one preset condition is satisfied, and to prohibit processing of the message data by the message data processing section for display, based on a determination that the at least one preset condition is satisfied; and
a dial lock setting section configured to perform a dial lock process for rejecting key operations by the user when the processing of the message data is prohibited by the operation prohibition setting section.

14. The mobile communications terminal according to claim 13, wherein
the dial lock setting section is configured to activate the dial lock process based on an instruction from the operation prohibition setting section, wherein
operations that are driven by the message data processing section are prohibited when the dial lock process is activated.

15. A computer-readable memory storing instructions, which when executed by a processor, cause the processor to perform a message data processing method for a mobile communications terminal including a message data processing section configured to process message data, an operation prohibition setting section, and a dial lock setting section, the message data processing method comprising:

receiving the message data in the mobile communications terminal;

in response to receiving the message data, determining, by the operation prohibition setting section of the mobile communications terminal, whether at least one preset condition stored in a memory of the mobile communications terminal is satisfied, the at least one preset condition being customizable by a user of the mobile communications terminal;

prohibiting, by the operation prohibition setting section, processing of the message data by the message data processing section for display, based on a determination that the at least one preset condition is satisfied; and     performing, by the dial lock setting section, a dial lock process for rejecting key operations by the user when the processing of the message data is prohibited by the operation prohibition setting section.

\* \* \* \* \*